United States Patent [19]
Teel

[11] Patent Number: 6,076,298
[45] Date of Patent: Jun. 20, 2000

[54] FISHING SUPPLY CADDY

[76] Inventor: Prinsez Teel, P.O. Box 98496, RAFB, Ga. 31098

[21] Appl. No.: 09/252,793

[22] Filed: Feb. 19, 1999

Related U.S. Application Data

[60] Provisional application No. 60/079,495, Mar. 26, 1998.

[51] Int. Cl.[7] .................................................. A01K 97/00
[52] U.S. Cl. .......................................................... 43/54.1
[58] Field of Search ..................................... 43/54.1, 21.2; 62/457.1; 280/47.19, 47.26, 47.35

[56] References Cited

U.S. PATENT DOCUMENTS

| | | | |
|---|---|---|---|
| D. 378,456 | 3/1997 | Speicher | D34/25 |
| 2,743,937 | 5/1956 | Ginsberg | 280/47.35 X |
| 3,395,550 | 8/1968 | Dugan | 62/457.1 X |
| 4,128,170 | 12/1978 | Elliott . | |
| 4,353,182 | 10/1982 | Jundas et al. . | |
| 4,615,137 | 10/1986 | Radmanovich | 43/57 |
| 4,763,907 | 8/1988 | Raymond | 280/47.35 |
| 4,870,778 | 10/1989 | Sheppard | 43/55 |
| 4,871,099 | 10/1989 | Bogar, Jr. | 43/21.1 X |
| 5,159,777 | 11/1992 | Gonzalez . | |
| 5,203,815 | 4/1993 | Miller . | |
| 5,249,438 | 10/1993 | Rhaney et al. . | |
| 5,259,215 | 11/1993 | Rocca | 62/457.1 X |
| 5,285,656 | 2/1994 | Peters | 62/457.1 |
| 5,305,544 | 4/1994 | Testa, Jr. | 43/54.1 |
| 5,471,779 | 12/1995 | Downey . | |
| 5,584,138 | 12/1996 | Newbert | 43/57.1 |
| 5,864,981 | 2/1999 | Zeman | 43/54.1 |

FOREIGN PATENT DOCUMENTS

| | | |
|---|---|---|
| 3601224 | 7/1987 | Germany . |
| 1751024 | 7/1992 | Russian Federation . |

*Primary Examiner*—Michael J. Carone
*Assistant Examiner*—Jeffrey L. Gellner
*Attorney, Agent, or Firm*—Richard C. Litman

[57] ABSTRACT

A molded plastic fishing supply caddy on four traction wheels and having a foldable rear handle. The handle is locked at a 45° angle for pushing or pulling the caddy on two wheels in rough terrain or in sand. The caddy is compartmentalized with a food cooler compartment and a live bait well compartment in the rear with doubled lids. A tackle box is stored under the smaller cooler lid. A large open forward compartment carries fishing paraphernalia such as casting nets, wading boots, rain gear, folding seats, buckets, etc. An open-tubed bracket structure is provided at a forward end, for fishing rods and a beach umbrella.

11 Claims, 3 Drawing Sheets

FISHING SUPPLY CADDY

CROSS-REFERENCE TO RELATED APPLICATION

This application claims the benefit of U.S. Provisional Patent Application Ser. No. 60/079,495, filed Mar. 26, 1998.

BACKGROUND OF THE INVENTION

1. Field of the Invention

The present invention relates to a plastic fisherman's supply caddy on four traction wheels with a rear handle adjustable in inclination and spacious enough to carry casting nets, handled fish landing nets, wading boots, bait buckets, rain gear, folding chairs, and the like in one large forward compartment. A second rear compartment is a double-lidded cooler for the fish catch and frozen bait with a tackle box storage in the second lid, and a third rear compartment has another double lid for an aerated live bait well. A forward apertured bracket supports a plurality of fishing rods with reels and/or a beach umbrella.

2. Description of Related Art

The related art of interest describes various fishing supply devices, but none disclose the fishing supply caddy with its numerous compartments and advantages of a lockable handle of the present invention. The related art will be discussed in the order of perceived relevance to the present invention.

U.S. Pat. No. 4,128,170 issued on Dec. 5, 1978, to Charles Elliott describes a combination tackle box, bait holder, cooler and seat means. The insulated cooler is either cubical or cylindrical and attached by latches to a similar shaped upper container which serves as a seat and has two rear bait wells, two front drawers and a central access opening. A pivoting handle is attached to the cooler. The Elliott device is distinguished by its immobile fisherman's appliance, the lack of a cooler, and the requirement for two separable sections.

U.S. Pat. No. 5,471,779 issued on Dec. 5, 1995, to Edward Downey describes a fishing implement storage apparatus consisting of a live bait holding chest with a lid serving as a seat. A pivoting handle has a fishing line cutter on one arm. A rod holder and bait net holder are provided on one side of the rectangular chest. On another side an aerator module and a storage compartment for fishing accessories are attached. The apparatus of this patent is distinguished by its lack of wheels and a cooler.

U.S. Pat. No. 5,159,777 issued on Nov. 3, 1992, to Oziel Gonzalez describes a fishing cart apparatus with two wheels having in descending order from the two handles, a tool box tray, a mesh basket, a cooler tray plate with tie-down cords for a cooler, and a work table between the wheels. On one post, a vertical support flange holds four horizontal fishing rod support tubes. The Gonzalez cart is distinguished by its two-handed, two-wheel cart apparatus.

U.S. Pat. No. 5,203,815 issued on Apr. 20, 1993, to Richard A. Miller describes another two-wheel hand cart with a loop handle. An upper foldable shelf has rod holding tubes and holds a tackle box. The lower shelf would carry an ice chest. The cart taught by this patent is distinguished by its two-handed, two-wheel cart and the lack of any integrated housing.

U.S. Pat. No. 5,249,438 issued on Oct. 5, 1993, to Michael A. Rhaney et al. describes a mobile cooler with retractable wheels and handles. The lack of other structural features such as a live bait well and storage space for sundry fishing equipment distinguish the cooler of this patent.

U.S. Pat. No. 4,353,182 issued on Oct. 12, 1982 to Ronald J. Junkas et al. describes a fishing box with a pivoting handle serving as a fishing rod carrier, a tackle box, a seat, a life preserver, a cooler, a worm and minnow bait compartment, a lid-table tray, a flip-out side table, a ruler for measuring fish length, a fish net holder, a towel rack, and an external bracket for a portable radio. The box disclosed by this patent is distinguished because the fishing box would be heavy to carry and lacks wheels.

German Patent No. 36 01 224 issued on Jul. 23, 1987, to Becht G. E. describes an angler's collapsible equipment box and seat with adjustable wheels and clips for storing fishing rods on two parallel rods serving as handles. The device is distinguished by its lack of four wheels, cooler compartment and a live bait well.

Russian Patent Application No. 1,751,024 published Jul. 30,1992, for Ponomarev describes a transportable rectangular container with two wheels, three compartments, extendable handles and legs at both ends, and a metal plate and socket for stacking containers. This container is distinguished by its lack of four wheels, cooler and a live bait well.

None of the above inventions and patents, taken either singly or in combination, is seen to describe the instant invention as claimed.

SUMMARY OF THE INVENTION

The present invention is a fisherman's supply caddy on four wheels with a rear handle adjustable in inclination and spacious enough to carry the following items: (1) food, frozen bait, and a tackle box in one rear compartment with doubled lids; (2) an aerator well for fresh living bait in another rear compartment with doubled lids; (3) a large forward compartment for casting nets, handled fish landing nets, wading boots, buckets, rain gear, folding chairs and the like; and (4) a forward bracket for holding fishing poles and/or a beach umbrella.

Accordingly, it is a principal object of the invention to provide a fishing supply caddy with four traction wheels and an extendable and lockable rear handle.

It is another object of the invention to provide a fishing supply caddy with a live bait well in one compartment with two integrated lids.

It is a further object of the invention to provide a fishing supply caddy with a food or frozen bait storage compartment with two integrated lids including a tackle box compartment in the second food cooler lid.

Still another object of the invention is to provide a fishing supply caddy with a large open storage compartment for casting nets, handled fish landing nets, wading boots, buckets, rain gear, folding chairs and the like.

Yet another object of the invention is to provide a fishing supply caddy with a forward bracket for holding surf-casting poles with reels and a beach umbrella.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
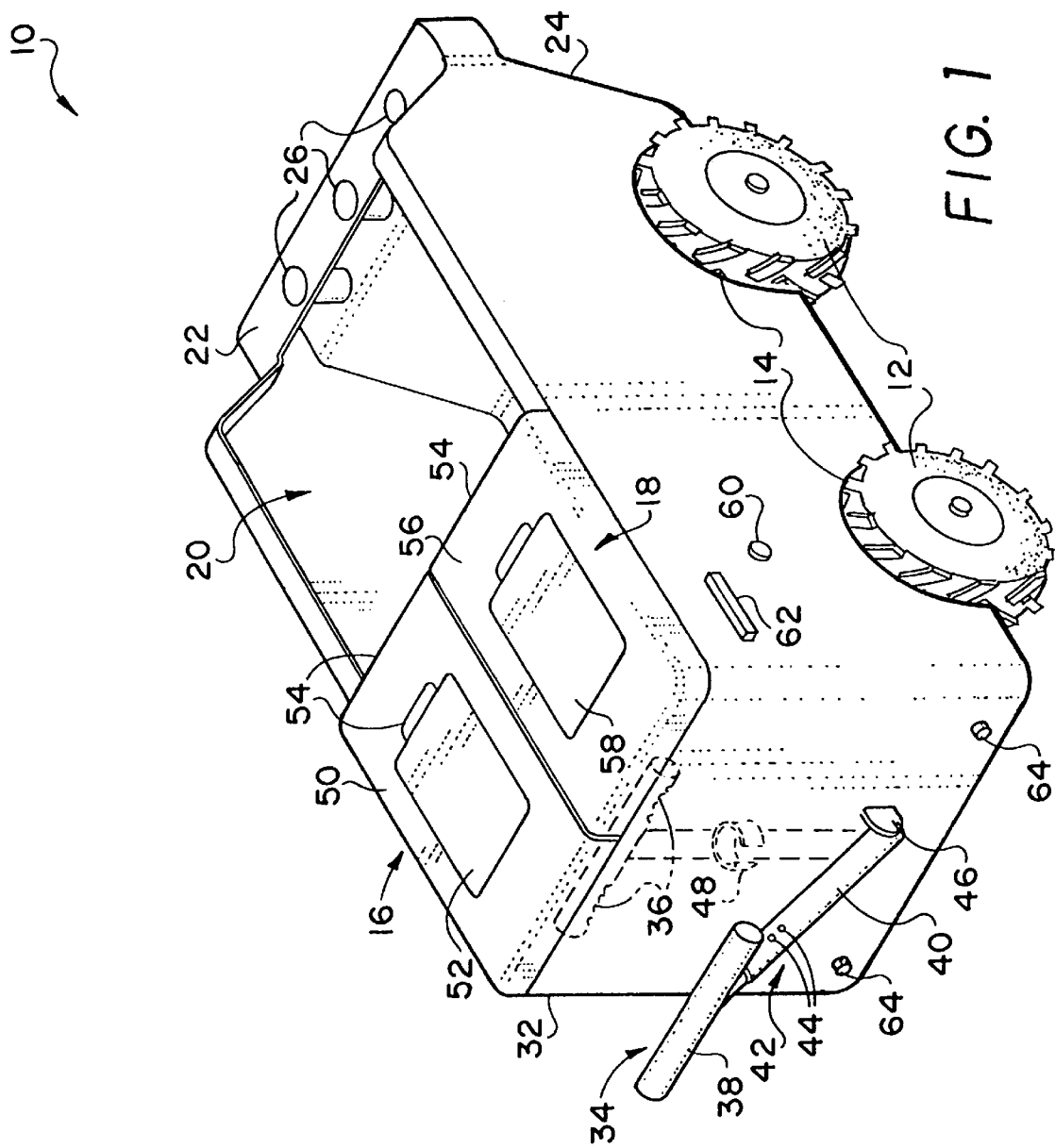
FIG. 1 is a perspective view of a fishing supply caddy according to the present invention.
Figure 2:
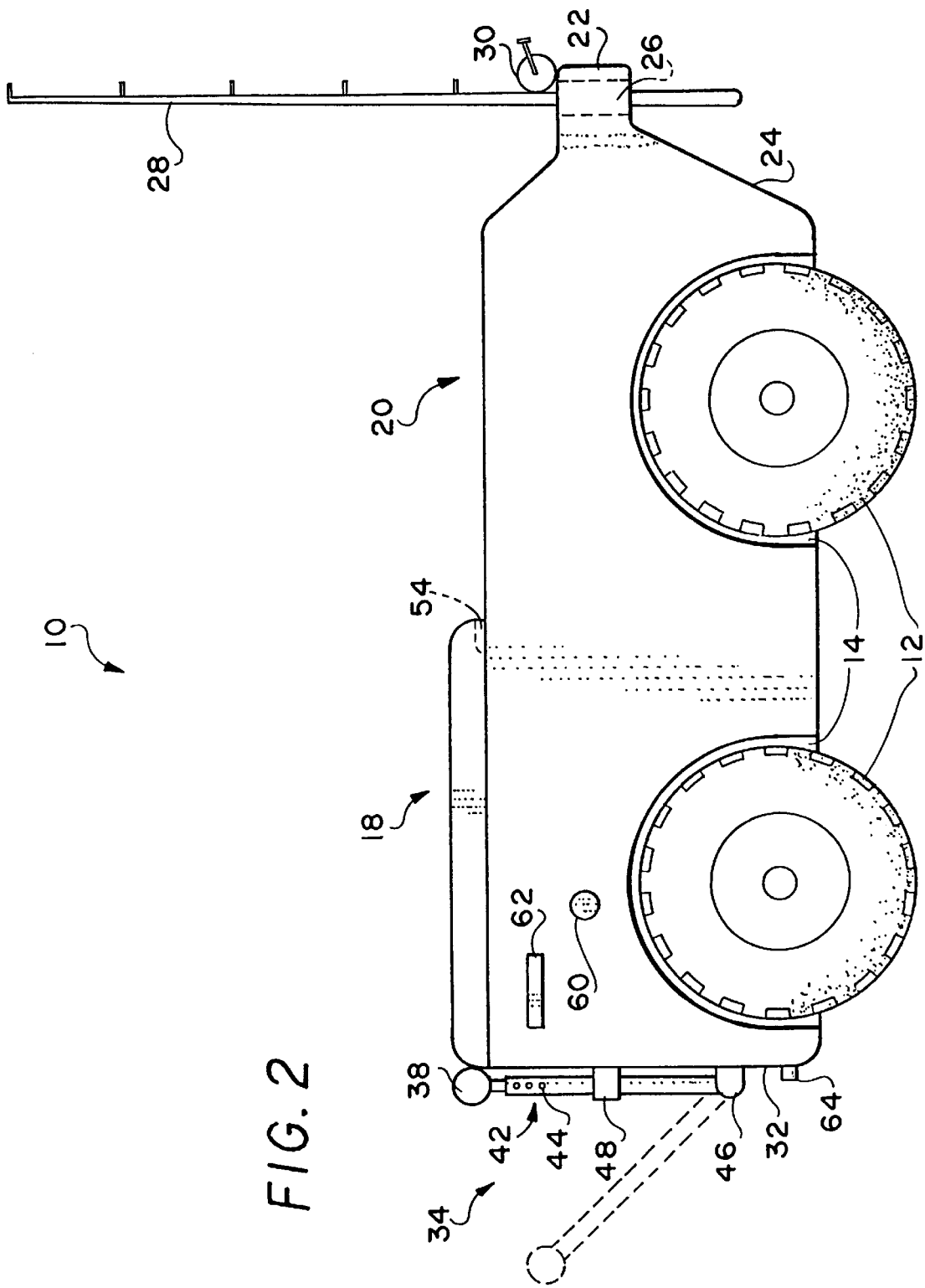
FIG. 2 is a right side view of the fishing supply caddy.
Figure 3:
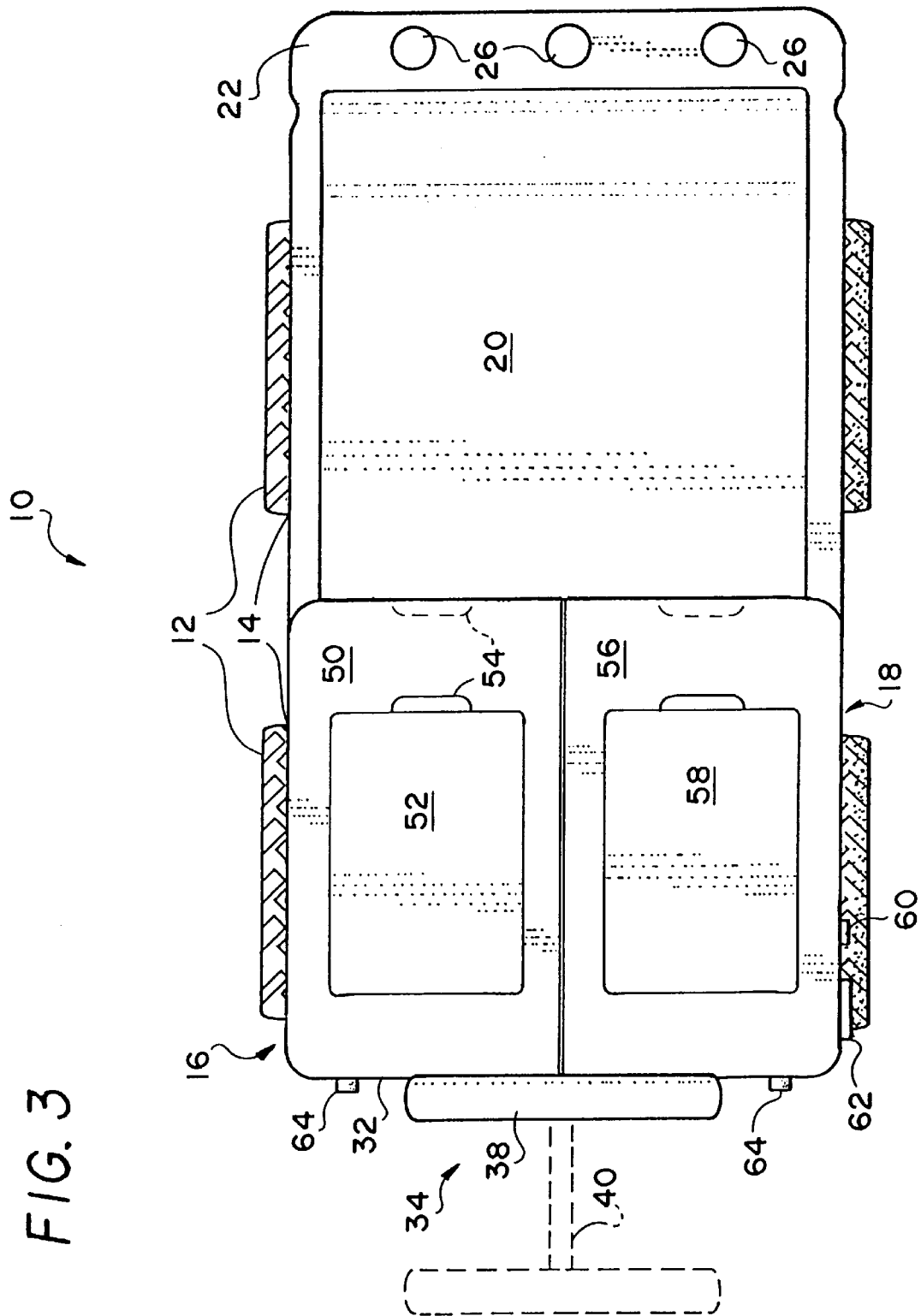
FIG. 3 is a top view of the fishing supply caddy.

In FIGS. 1–3, a plastic molded fishing supply cart or caddy 10 provided with four traction ribbed wheels 12 set into wheel wells 12, a cooler compartment 16, a live bait well compartment 18, and a spacious open storage compartment 20 for miscellaneous fishing items. A bracket 22 on a front wall 24 has a plurality of tubes 26 for holding fishing poles 28 with reels 30 (FIG. 2). It should be noted that a beach umbrella (not shown) can also be accommodated by a tube 26 in the bracket 22.

On the rear wall 32, an extendible T-shaped handle 34 with bottom gripping grooves 36 in the handle bar 38. The handle stem 40 has locking elements 42 (hidden spring loaded buttons for apertures 44 in the stem 40) for both the telescoped vertical position and the extended position. At approximately 45° from the vertical position, another locking element (hidden) in the locking base bracket 46 maintains the angled position to provide for either pushing or pulling the caddy 10. This locking feature is important for handling or lifting one end of the caddy 10 when in deep sandy or rough seashore terrain, because the caddy can be pulled or pushed on either the rear or forward pair of wheels 12, with the opposite pair of wheels lifted out of contact with the sand or ground. When the caddy 10 is parked, the handle 28 can be locked in the upright storing position out of the way by another locking bracket 48 provided on the rear wall 32 of the caddy 10.

The first forward storage compartment 20 is normally uncovered and spacious for the storage of various bulky fishing equipment and other gear such as casting nets, fish landing nets with handles, wading boots, raincoats, bait buckets, folding chairs and the like paraphernalia (not shown). A tarpaulin (not shown) can be provided and secured by snaps on the periphery of the compartment 20.

In the rear portion of the caddy 10, a second insulated cooler compartment 16 is provided with a first large lid 50 (on the left as viewed from the rear of the caddy in FIG. 1) for storing frozen bait, fish, lunch and the like. The first cooler lid 50 has another smaller second lid 52 for a compartment to store a fishing tackle box (not shown). The large lid 50 and the small integrated lid 52 have handle grooves 54 for access in lifting up each lid. A drain port 64 for draining and cleaning the cooler compartment 16 is made available proximate to the bottom of the caddy 10 in the rear.

Next to the cooler compartment 16, a third compartment houses the live bait well 18 with a similar arrangement of lids and handles, there being a first bait well lid 56 with a smaller second lid 58 for retrieval of the live bait fish. The large lid 56 is available for cleaning of the bait well 18. The bait well 18 is equipped with an external plug 60 on a sidewall for an aerator hose (not shown) to be connected. A catch or bracket 62 is also available next to the plug 60 for connection of an aerator pump and battery assembly (not shown). Another drain port 64 is available on the rear wall 32 for cleaning and drainage of the bait well 18.

It should be noted that the projecting bracket 22 is available in the front of the caddy 10 to hold fishing rods 28 in the tubular rod holders 26 with the fishlines out in the water and a beach umbrella (not shown) accommodated by a rod holder 26 for affording shade to the fisherman.

Thus, a unique fisherman's supply caddy which carries everything that any surfcaster needs for an outing on the beach is made available with adequate traction wheels, and yet is not cumbersome or unwieldy to handle.

It is to be understood that the present invention is not limited to the embodiments described above, but encompasses any and all embodiments within the scope of the following claims.

I claim:

1. A fishing supply caddy apparatus having a cooler and means for maintaining live bait, and adapted to carrying fishing paraphernalia comprising:

a rectangular, molded plastic, fishing supply caddy cart with a front end and a rear end, and having four supporting wheels;

a cooler compartment located in said rear end with a first lid including a smaller second lid, wherein said second lid has a storage space for a tackle box;

a live bait well compartment located in said rear end with a third lid including a smaller fourth lid;

an open storage space located proximate to said front end for carrying fishing paraphernalia;

a T-shaped handle located in said rear end and adapted to be lockable in a vertical position and at an inclined position 45° from the vertical position; and a bracket projecting from said front end and having holding means for holding a plurality of fishing poles and a beach umbrella;

whereby said caddy can be pulled and pushed in rough terrain and deep sand by said supporting wheels when said handle is locked in said 45° inclined position.

2. The fishing supply caddy apparatus according to claim 1, including a catch means and a plug means located on a side of said cart, for attaching a battery operated aerator pump system.

3. The fishing supply caddy apparatus according to claim 1, there further being drainage ports in said rear end of said cart, for said cooler compartment and said live bait well compartment.

4. The fishing supply caddy apparatus according to claim 1, wherein said T-shaped handle is telescopic and has locking means for maintaining a normal position and an extended position.

5. The fishing supply caddy apparatus according to claim 1, wherein said bracket extends the full width of said caddy apparatus and includes at least three vertical holes therethrough, which define said holding means.

6. The fishing supply caddy apparatus according to claim 1, wherein said wheels are traction wheels.

7. The fishing supply caddy apparatus according to claim 1, wherein said first and said third lids are of approximately identical, predetermined dimensions.

8. The fishing supply caddy apparatus according to claim 1, wherein said second and said fourth lids are of approximately identical, predetermined dimensions.

9. The fishing supply caddy apparatus according to claim 1, further comprising a battery operated aerator pump system connected to said live bait well compartment.

10. A fishing supply caddy apparatus having a cooler and means for maintaining live bait, and adapted to carrying fishing paraphernalia comprising:

a rectangular, molded plastic, fishing supply caddy cart with a front end and a rear end, and having four supporting wheels;

a cooler compartment located in said rear end with a first lid including a smaller second lid, wherein said second lid has a storage space for a tackle box;

a live bait well compartment located in said rear end with a third lid including a smaller fourth lid, there further being a catch means and a plug means located on a side of said cart, for attaching a battery operated aerator pump system, and means interconnecting said live bait well compartment with a battery operated aerator pump system;

an open storage space located proximate to said front end for carrying fishing paraphernalia;

a T-shaped handle located in said rear end and adapted to be lockable in a vertical position and at an inclined position 45° from the vertical position; and a bracket projecting from said front end and having holding means for holding a plurality of fishing poles and a beach umbrella;

whereby said caddy can be pulled and pushed in rough terrain and deep sand by either said four wheels or two aligned wheels when said handle is locked in said 45° inclined position.

11. The fishing supply caddy apparatus according to claim 10, further comprising a battery operated aerator pump system connected to said live bait well compartment.

* * * * *